Dec. 19 1922.
W. WHITE.
RELATIVE SPEED INDICATOR.
FILED JUNE 3. 1916.
1,439,137
2 SHEETS-SHEET 1.
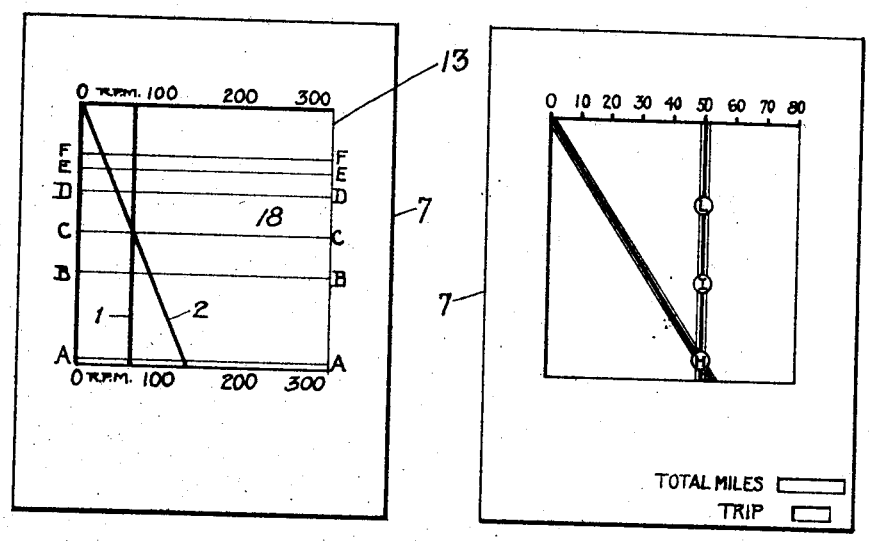
Fig. 1
Fig. 2
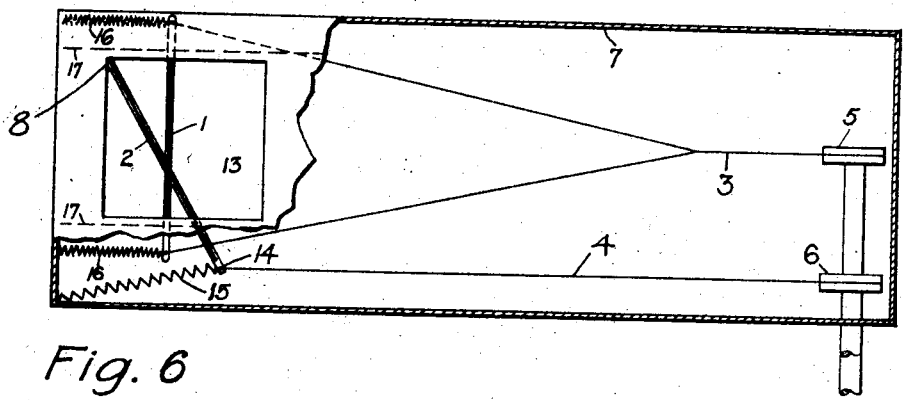
Fig. 6
Inventor
Wallace White Dec. 19 1922.

W. WHITE.
RELATIVE SPEED INDICATOR.
FILED JUNE 3, 1916.

Inventor
Wallace White

Patented Dec. 19, 1922.

1,439,137

UNITED STATES PATENT OFFICE.

WALLACE WHITE, OF PELHAM, NEW YORK.

RELATIVE-SPEED INDICATOR.

Application filed June 3, 1916. Serial No. 101,546.

*To all whom it may concern:*

Be it known that I, WALLACE WHITE, a citizen of the United States, residing at Pelham, in the county of Westchester, State of New York, have invented a new and useful Relative-Speed Indicator, of which the following is a specification.

My invention relates to speed indicating devices and particularly to a device for indicating the speed of one rotating body with respect to that of a second rotating body.

The object of my invention is to provide a simple construction which will indicate the ratio of the speeds of two rotating bodies irrespective of the absolute speed of either, or of speed variations. A further object is to provide such a device having suitable graduated scales so that it may be combined with the ordinary automobile speedometer and may serve to indicate when the main driving shaft and the countershaft are rotating at the relatively proper speeds to enable the various gear shifts to be made without clashing of the gears.

My invention consists in the construction, combination and arrangement of part as herein illustrated, described and claimed.

In the accompanying drawings forming part hereof, I have illustrated a form of embodiment of my invention, in which drawings similar reference characters designate corresponding parts, and in which:

Figure 1 is a front elevation;

Figure 2 is a front elevation showing graduations for use with an automobile;

Figure 6 is a front elevation of a modified form of the device with part of the casing broken away; and, Figure 7 is a diagrammatic view, to show an application of the invention.

Figure 3:
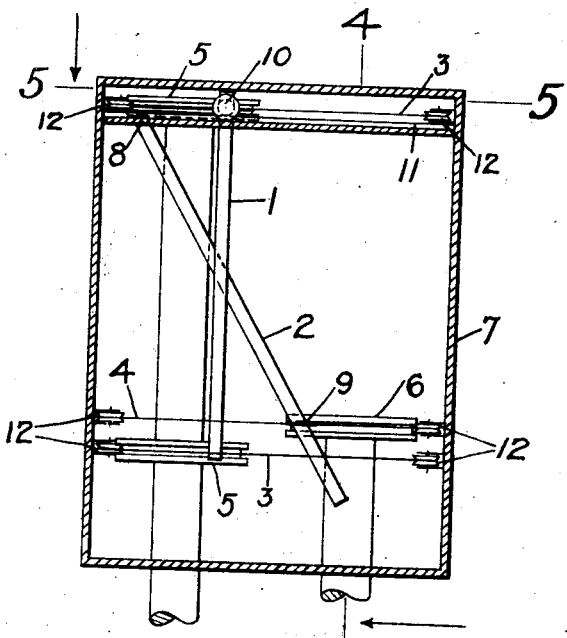
Figure 3 is a vertical section taken approximately on line 3—3 of Figure 4 looking in the direction indicated by the arrow.
Figure 4:
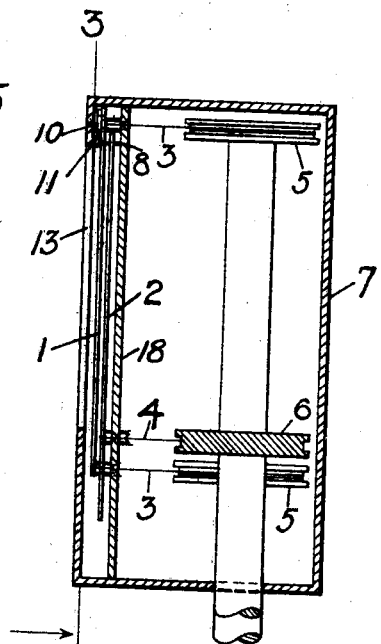
Figure 4 is a vertical section taken approximately on line 4—4 of Figure 3 looking in the direction indicated by the arrow.

Referring to the drawings, a vertical or primary indicating member 1 is so supported as to have lateral movement in proportion to the speed of rotation of a rotating body. A secondary indicating member 2 is pivoted near one end, as at 8, (see Fig. 3) and adapted to be moved on its pivotal support according to the speed of rotation of a second rotating body.

In the preferred form of carrying out the invention, as shown in Figures 1 to 5, the primary indicating member 1 is carried at its upper end by a flanged wheel 10 disposed to travel upon a guide 11. At the top and bottom of the member 1 are provided cords or other suitable means 3 of transmitting lateral motion to the member 1. A tachometer or other speed measuring device of any known type, such as the ordinary automobile speedometer, having a member 5 the displacement of which measures and is in proportion to the speed of revolution of the rotating body to which the tachometer shaft is attached, is provided and the motion transmitting means 3 is connected to this part 5 of the tachometer so that the displacement is transmitted to the member 1. A graduated scale, such as the upper scale in Figures 1 and 2, may then be placed upon the face of the casing 7 and the speed of revolution of the first rotating body is thus measured.

A second tachometer 6 of a common type is provided and a cord or other motion transmitting means 4 is attached thereto and connected to a link 9 arranged to slidably supported and operate the secondary indicating member 2. The displacement of the part 6 is thus communicated to the member 2. A graduated scale, such as the lower scale in Figure 1, may be provided upon the face of the casing 7 so that the speed of rotation of the second rotating body may be read directly.

A screen 18 is preferably provided in the casing 7 behind the indicating members so that the tachometers and operating means may not be exposed to view. The space in the front face of the casing 7 is preferably provided with a glass 13. Either the glass or the screen may have a graduated scale for indicating the relative speed, such as the horizontal lines A—A, B—B, etc., (see Fig. 1).

In order to clearly understand the operation of the device, let it be assumed that when the two rotating bodies have the same angular speed, the lateral displacement of the pivoted indicating member 2 to the right from the zero position measured along the line A—A is equal to the lateral displacement of the primary indicating member. Then if the speed of the second rotating body is increased to twice the speed of the first rotating body, the lateral displacement of the secondary indicating member measured along the line A—A will be twice as great as the lateral displacement of the primary indicating member. Therefore, the secondary indicating member 2, will intersect the primary indicating member 1 on the line C—C, which is located half way from the horizontal line A—A to a horizontal line through the pivot 8 of the secondary idnicating member 2 (see Fig. 1). Whenever the speed of the second rotating body is twice that of the first, therefore, the primary and secondary indicating members will intersect upon the horizontal line C—C, and when the second rotating body is going at three times the speed of the first, the intersection of the two members will occur on the horizontal line D—D, which is one third of the way from the pivot to the line A—A, and so on. It will thus be seen that irrespective of the position of the primary indicating member 1, whenever the second rotating body is going at twice the speed of the first, the two indicating members will intersect upon the horizontal line C—C, when three times on the line D—D, and so on for all other speed ratios within the range of the indicator.

It is obvious that the gear ratios of the tachometers may be varied so that instead of the line A—A being the locus of the intersections when the two bodies are rotating at the same speed, it may be used to indicate any desired speed ratio. For instance, the gearing may be so arranged that the indicating members intersect on the line A—A when the second body is rotating at 50 times the speed of rotation of the first. Then intersections upon the line B—B indicate that the second body is rotating 75 times as fast as the first; on the line C—C, 100 times as fast; on the line D—D, 150 times as fast, and so on.

In the actual construction of the machine, since the indicating member 1 has only rectilinear horizontal movement it is unnecessary to place the horizontal lines upon the glass 13 or the screen 18, and the graduations or characters comprising the scale may be placed upon the primary indicating member itself as shown in Figure 2.

It is preferable to attach the cords 3 to the primary indicating member 1 and pass them around the pulleys 12 and then take a full turn on the tachometer 5, passing the cord then around the second pulley 12 and connecting up again with the primary indicating member. Motion of the tachometer is thus transmitted positively in both directions to the indicating member. The cord 4 is preferably similarly connected between the link 9 and the tachometer 6.

A modified form of the apparatus is shown in Figure 6. The cord 4 from the tachometer 6 may be attached directly to the end 14 of the member 2 in cases where there is sufficient space so that a wide instrument is not objectionable and the angularity of the cord in transmitting the motion to the member 2 may be made so slight as not to materially affect the accuracy of the instrument. Instead of having the cords 3 and 4 continuous, they may, as shown in Figure 6, be connected up so as to move the indicating members positively in one direction while springs or other resilient members 15 and 16 may be provided to return the indicating members to the zero position. In place of the wheel 10 and guide 11, the indicating member 1 may have holes bored therein so as to slide upon guide wires 17.

Figure 5:
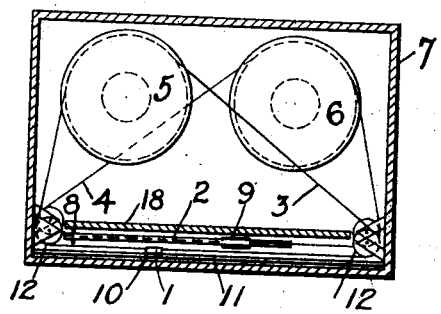
Figure 5 is a horizontal section taken approximately on line 5—5 of Figure 3 looking in the direction indicated by the arrow.
Figure 7:
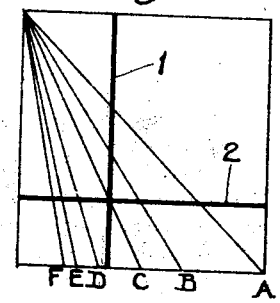

In Figure 7 is shown an application of the principle in which the primary indicating member 1 has lateral motion as before, and the secondary indicating member 2 has similar motion at right angles thereto instead of motion about a pivot. The scale upon which the speed ratios are read is then graduated with a series of lines converging at the zero point. As shown in Figure 7, the second rotating body is rotating at twice the speed of the first, since the two members intersect on the line C, it being assumed as before that the line A is the locus of the intersections when the two bodies are rotating at the same speeds.

In order to adapt this apparatus for use with an automobile the primary indicating member 1 is connected through suitable means such as a tachometer to the front wheel or other part of the car, the rotation of which varies with the linear speed of the car, in the same manner as is the ordinary speedometer. The gearing is so arranged that the speed of the car in miles per hour may be read opposite the indicating member on the upper scale shown in Figure 2.

The means for operating the secondary member 2 is connected to any rotating part of the engine, or to the counter-shaft in the gear box. The gearing is suitably arranged so that when the motor and car are connected in high gear or third speed, the secondary indicating member intersects the primary indicating member at the point H of Figure 2. The point I is then marked upon the primary indicating member at such a point that, when the secondary member intersects the primary member at this point, the peripheral speeds of the gears that are to mesh when the gear lever is shifted to the second position are the same; and the point L is marked upon the primary indicating member at the point where the secondary member intersects the primary member when the peripheral speeds of the gears forming the lowest speed gear combination are the same. It will readily be recognized that these points may be set for different automobiles to correspond with their different gear ratios, and being once set, remain constant for that particular gear set. As indicated in Figure 2 an odometer may be combined with the device as with the ordinary speedometer.

Having fully described my invention I claim as new and desire to secure by Letters Patent:

1. A device for indicating speed ratios comprising intersecting indicating members, the point of intersection being variable as to each member.

2. A speed indicator comprising independently actuated indicating members arranged to intersect each other at any point within the indicating range.

3. In a speed indicator, the combination comprising an indicating member arranged to have lateral motion and a pivoted indicating member arranged to intersect the first named member.

4. A speed indicator comprising intersecting indicating members, and means for moving said members independently.

5. In a speed indicator, the combination, comprising intersecting indicating members, and tachometers operatively connected to the indicating members.

6. In a speed indicator, the combination comprising intersecting indicating members, tachometers, and means for transmitting movement from said tachometers to the indicating members to vary the point of intersection.

7. In a speed indicator, the combination comprising a plurality of intersecting indicating members, a plurality of tachometers, flexible members connected one to each of the intersecting indicating members and to a tachometer.

8. In a speed indicator, the combination comprising independently actuated intersecting indicating members, the point of intersection being variable as to each member, scales upon which speeds are indicated by the intersecting of the members therewith, and a scale upon which ratios of said speeds are indicated by the mutual intersection of said members.

9. In a speed indicator, the combination comprising a supporting member, two independently actuated intersecting indicating members carried by the supporting member, and a scale arranged to indicate ratio of speed by the relative positions of the indicating members.

10. A device for indicating speed ratios comprising in combination mechanism for measuring two speeds of rotation and means associated with said mechanisms for indicating the ratio of speeds measured thereby.

11. A speed ratio indicator comprising two indicating members, means for moving said members according to the speeds the ratio of which is to be measured, one of said members having a scale upon which the ratio is indicated by the point of intersection of the other member therewith.

12. A device for indicating speed ratios, comprising intersecting indicating members, and speed measuring means operatively connected to said members.

13. A speed ratio indicator comprising intersecting indicating members, speed measuring means, and means for transmitting movement from said speed measuring means to the indicating members to vary the point of intersection.

14. In a relative speed indicator, a reciprocable indicating member, means for displacing said member according to the speed of a moving part, a rotatable indicating member, and means for displacing the rotatable member according to the speed of a second moving part, said members being arranged for operation in intersecting paths.

15. In a speed indicator, the combination comprising a scale, means for moving said scale according to certain speeds, an indicating member arranged for coöperation with said scale, and means for moving said member according to certain other speeds.

16. In a speed indicator, a pair of indicating members, arranged to be moved in intersecting paths to give an indication by their relative positions, a pivotal support for one of said members, and means for rotating said latter member about its pivot such that the tangent of the angle of rotation is proportional to speeds measured.

17. In a speed indicator, a supporting member, indicating members movable thereon, speed measuring means carried thereby and arranged to actuate the indicating members, and a scale carried by one of the mentioned members for indicating ratios of speeds measured.

WALLACE WHITE.